(12) United States Patent
Quint et al.

(10) Patent No.: US 12,546,616 B2
(45) Date of Patent: Feb. 10, 2026

(54) ENERGY CONSUMPTION PREDICTIONS, FEEDBACK, AND COACHING FOR OFF-ROAD ACTIVITIES

(71) Applicant: Rivian IP Holdings, LLC, Plymouth, MI (US)

(72) Inventors: Jason Meyer Quint, Ann Arbor, MI (US); Caroline Ayanian, Newport Beach, CA (US); Eswar Vignesh, Surrey (CA); Martin Munther Hermez, Long Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 370 days.

(21) Appl. No.: 18/111,327

(22) Filed: Feb. 17, 2023

(65) Prior Publication Data

US 2024/0280368 A1    Aug. 22, 2024

(51) Int. Cl.
  *G01C 21/34*    (2006.01)
  *G01C 21/36*    (2006.01)

(52) U.S. Cl.
  CPC ..... *G01C 21/3469* (2013.01); *G01C 21/3461* (2013.01); *G01C 21/3617* (2013.01); *G01C 21/3691* (2013.01); *G01C 21/3697* (2013.01)

(58) Field of Classification Search
  CPC ............ G01C 21/3461; G01C 21/3469; G01C 21/3617; G01C 21/3691; G01C 21/3697
  See application file for complete search history.

(56) References Cited

U.S. PATENT DOCUMENTS

| | | | |
|---|---|---|---|
| 11,498,445 B1 * | 11/2022 | Gurin | B60L 53/54 |
| 2018/0186357 A1 * | 7/2018 | Deshpande | B60W 30/188 |
| 2022/0219691 A1 * | 7/2022 | Maleki | G06F 11/0754 |
| 2022/0402399 A1 * | 12/2022 | Staats | B60L 50/53 |

\* cited by examiner

*Primary Examiner* — John Kwon
(74) *Attorney, Agent, or Firm* — HG LAW LLP

(57) ABSTRACT

Systems and methods are presented herein for generating energy consumption predictions for a vehicle, providing feedback on how to improve a rate of energy consumption of the vehicle, and generating recommendations (e.g., coaching) for improving an efficiency of energy consumption as a vehicle traverses a route (e.g., an off-road course). One or more of a rate of energy consumption of a vehicle or an amount of energy to be consumed by a vehicle arranged to traverse a route is predicted. Then one or more recommendations are provided to improve an efficiency of energy consumed by the vehicle while traversing the route. In response to determining the vehicle has completed the route, at least one recommendation is generated for improving an efficiency of energy consumption for a subsequent trip along the route.

20 Claims, 9 Drawing Sheets

ENERGY CONSUMPTION PREDICTIONS, FEEDBACK, AND COACHING FOR OFF-ROAD ACTIVITIES

INTRODUCTION

The present disclosure is directed to systems and methods for generating energy consumption predictions for a vehicle, providing feedback on how to improve a rate of energy consumption of the vehicle, and generating recommendations (e.g., coaching) for improving an efficiency of energy consumption as a vehicle traverses a route (e.g., an off-road course).

SUMMARY

The disclosure is generally directed to providing driving recommendations to a user of a vehicle based on an amount of available energy for moving the vehicle, and, more particularly, to a vehicle system that predicts whether the vehicle has enough energy to traverse a route (e.g., a predetermined route), provides recommendations for improving the efficiency of energy use after traversing the route, and provides coaching while traversing the route to ensure the vehicle retains enough energy to complete the route. For example, a user of a vehicle may decide to take their vehicle to a known driving trail (e.g., a popular or known off-road trail) or may have a regular route the user takes to get to their place of work or their home. The user may want to verify that the vehicle can complete the route or trail before starting to take the vehicle along the route. In some embodiments, processing circuitry may generate a notification to the user regarding whether there is enough stored energy to traverse the route.

The user may decide to start the route based on the notification and in response to determining the vehicle has started to traverse the route, recommendations are provided to the user (e.g., via an interface in the vehicle that alerts the user to information about the vehicle) to improve an efficiency of energy consumed by the vehicle while traversing the route. For example, processing circuitry may determine that based on the current weight distribution in the vehicle that the energy stored in the vehicle is being consumed at an inefficient rate. In response to this determination, the user may be presented with a recommendation to shift cargo to adjust the weight distribution to improve the efficiency of energy consumption in the vehicle and enable the vehicle to retain enough energy to complete the route. In some embodiments, in response to determining the vehicle has completed the route, at least one recommendation is generated for the user to view for improving an efficiency of energy consumption for a subsequent trip along the route using the vehicle. For example, the recommendation may be one or more of lowering the ride height, increasing tire pressure, or suggesting to only take the route when the weather conditions enable sufficient road conditions along the route to prevent tire slip.

The system may determine whether the vehicle has enough stored energy by a couple different methods. For example, trip data associated with the route may be identified. The trip data may be generated by the vehicle or other vehicles. In the event the trip data is from other vehicles, a comparison between various attributes and the current vehicle is performed. Processing circuitry generates a compatibility score, which is compared to a threshold. If the compatibility score meets or exceeds the threshold, the trip data from the other vehicle is used to determine whether the current vehicle at its current power level can complete the route. In some embodiments, the trip data retrieved or identified may be sourced from vehicles of a same manufacturer or any vehicle that generates data in response to traversing the route. The trip data may be stored and retrieved from a server communicatively coupled to the current vehicle and accessible by the vehicle user.

In some embodiments, an indication is generated for display, or for user perception, of whether the vehicle has enough energy stored to traverse the route. Some examples of what the indication includes are a notification of current energy level of the vehicle, a notification of whether the current energy levels are sufficient to enable the vehicle to traverse the route in its entirety, a recommendation for recharge, a location of where one or more charging stations are accessible, based on the current energy level of the vehicle, or descriptive information of conditions associated with the route which could affect the ability of the vehicle to complete the route.

These techniques provide improvements over existing approaches. In particular, this approach does not rely on a range computation of a vehicle (e.g., based on an amount of stored energy or fuel) and instead considers a plurality of variables related to energy consumption such as driver behavior, vehicle configurations, and environmental conditions as retrieved from a server that stores information provided by one or more other vehicles in response to traversing or completing related routes in related conditions using vehicles with one or more shared configuration elements. Thus, the prediction of energy available (e.g., as would be associated with a vehicle range of travel) is based on a weighted computation of the aforementioned variables in order to improve the validity of the predicted energy available and trip completion likelihood. This approach also does not require adjustment of vehicle settings from a driver seat (e.g., merely by pressing a button to modify a vehicle mode while driving) and instead provides feedback on how to adjust the weight distributed throughout the vehicle in order to align energy consumption predictions with current driving conditions thereby resulting in a manual adjustment of the vehicle assembly or components therein. Additionally, approaches described herein provide recommendations for subsequent trips such that a driver of a vehicle is afforded insight regarding modifications to their vehicle assembly as opposed to merely modifying use of the vehicle with compensating systems.

In some embodiments, determining whether the vehicle has enough stored energy to traverse the route comprises identifying data corresponding to a previous trip associated with the route. A first configuration of the vehicle is compared with a second configuration of a vehicle that completed the trip. Based on the comparison, a compatibility score is generated. The compatibility score to is compared a threshold. In response to determining the compatibility score meets or exceeds the threshold, an indication of whether the vehicle has enough energy stored to traverse the route is generated for display. In some embodiments, identifying data comprises requesting data from a server of previous trips completed along the route using the vehicle. In some embodiments, identifying data comprises requesting data from a server of previous trips completed along the route using other vehicles with one or more attributes related to the vehicle.

In some embodiments, identifying data corresponding to the previous trip associated with the route comprises determining one or more identifying aspects of the route and searching for one or more of weather conditions or road conditions related to the route (e.g., using processing circuitry communicatively coupled to one or more servers configured to store and transmit data associated with weather or road conditions). Additionally, identifying the data comprises retrieving trip data from a server configured to store data related to vehicles that completed the route.

In some embodiments, the first configuration comprises one or more of the following examples of aspects of vehicle information corresponding to the vehicle: vehicle total weight, vehicle weight distribution, contents of cargo areas, tire pressure, battery charge, wheel base, ride height, active vehicle system errors, or tire and wheel size.

In some embodiments, providing recommendations to improve the efficiency of energy consumed while traversing the route comprises generating one or more of the following examples of recommendations: adjust tire pressure, adjust weight distribution, change location of cargo within vehicle, change drive mode, or adjust ride height.

In some embodiments, generating the at least one recommendation for improving the efficiency of energy consumption for the subsequent trip along the route comprises generating one or more of the following examples of recommendations: one or more of subsequent trip dates with different weather patterns, vehicle load layout modifications, vehicle configuration modifications, or tire modifications based on route or trail surface conditions.

In some embodiments, the indication of whether the vehicle has enough energy stored to traverse the route comprises one or more types of notifications, recommendations, or other information pertinent to the vehicle or the trip along the route. For example, the indication may comprise one or more of a notification of current energy level of the vehicle, a notification of whether the current energy levels are sufficient to enable the vehicle to traverse the route in its entirety, a recommendation for recharge, a location of where one or more charging stations are accessible based on the current energy level of the vehicle, or conditions associated with the route which could affect the ability of the vehicle to complete the route.

In some embodiments, the disclosure is directed to a vehicle system comprising elements configured to execute one or more aspects of the aforementioned methods. The vehicle system comprises one or more of a power source, a navigation system, a vehicle assembly comprised of the power source and the navigation system, a plurality of sensors configured to characterize the vehicle assembly, and processing circuitry arranged within the vehicle assembly and communicatively coupled to the power source, the navigation system, and one or more of the plurality of sensors. The processing circuitry is configured to execute one or more aspects of the methods described herein.

In some embodiments, the disclosure is directed to a non-transitory computer readable medium comprising computer readable instructions which, when processed by processing circuitry, cause the processing circuitry to determine whether a vehicle has enough stored energy to traverse a route by predicting one or more of a rate of energy consumption of a vehicle or an amount of energy to be consumed by a vehicle arranged to traverse a route. In response to determining the vehicle has started to traverse the route, the processing circuitry is configured to provide recommendations to improve an efficiency of energy consumed by the vehicle while traversing the route. Additionally, or alternatively, in response to determining the vehicle has completed the route, the processing circuitry is configured to generate for display at least one recommendation for improving an efficiency of energy consumption for a subsequent trip along the route using the vehicle. The non-transitory computer readable medium comprising computer readable instructions may be configured to cause processing circuitry to perform any or all of the various aspects of various embodiments of methods described herein.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for generating energy consumption predictions for a vehicle, providing feedback on how to improve a rate of energy consumption of the vehicle, and generating recommendations (e.g., coaching) for improving an efficiency of energy consumption as a vehicle traverses a route (e.g., an off-road course).

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
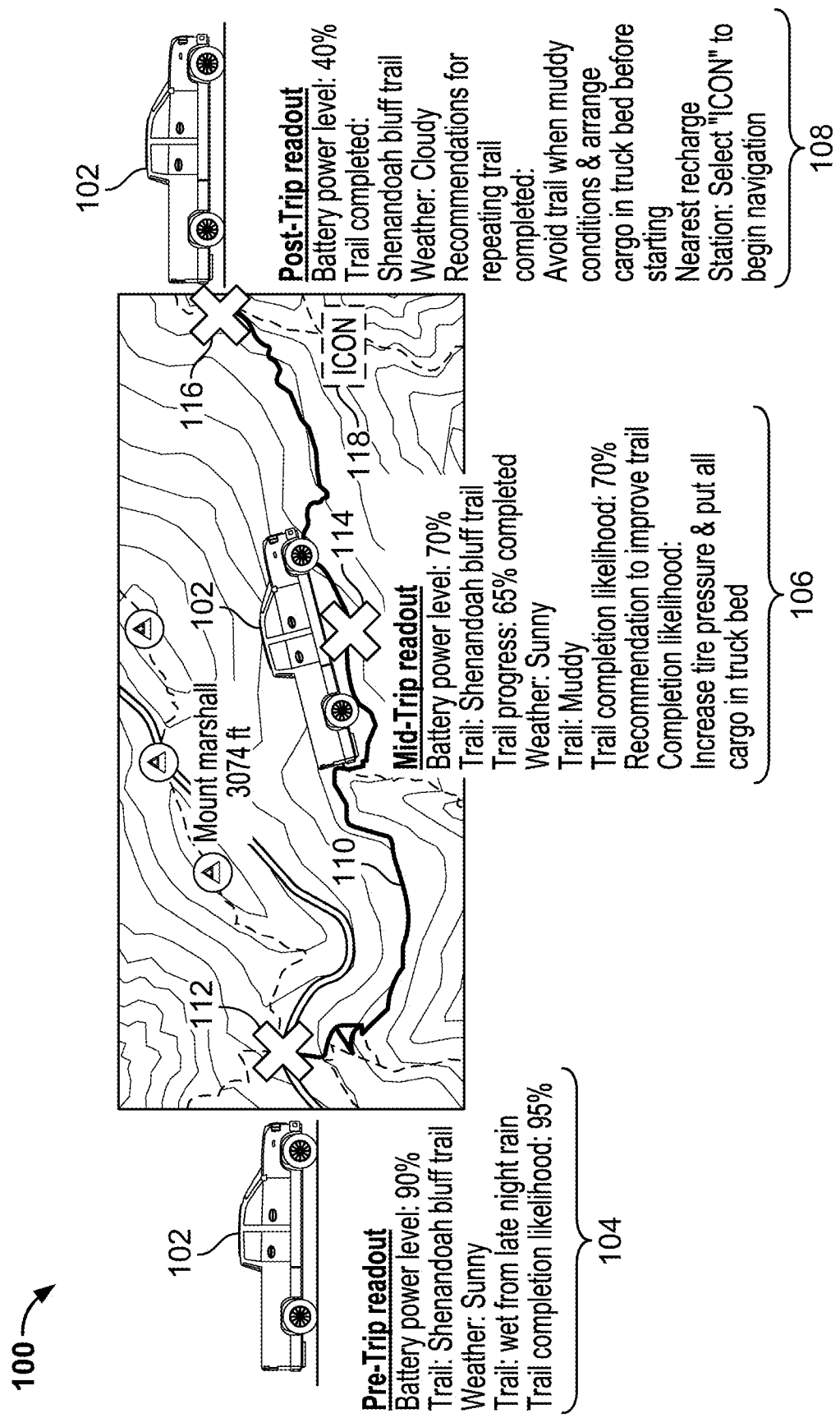
FIG. 1 depicts a scenario where a vehicle provides different readouts during different portions of a trip along a route, in accordance with some embodiments of the disclosure.

FIG. 1 depicts scenario 100 where vehicle 102 provides readouts 104, 106, and 108 during different portions of a trip along route 110, in accordance with some embodiments of the disclosure. Scenario 100 may result in the generation of one or more of energy prediction report 200 of FIG. 2 (e.g., as generated based on energy prediction method 300 of FIG. 3), energy consumption report 400 of FIG. 4 (e.g., as generated based on energy consumption method 500 of FIG.

Figure 6:
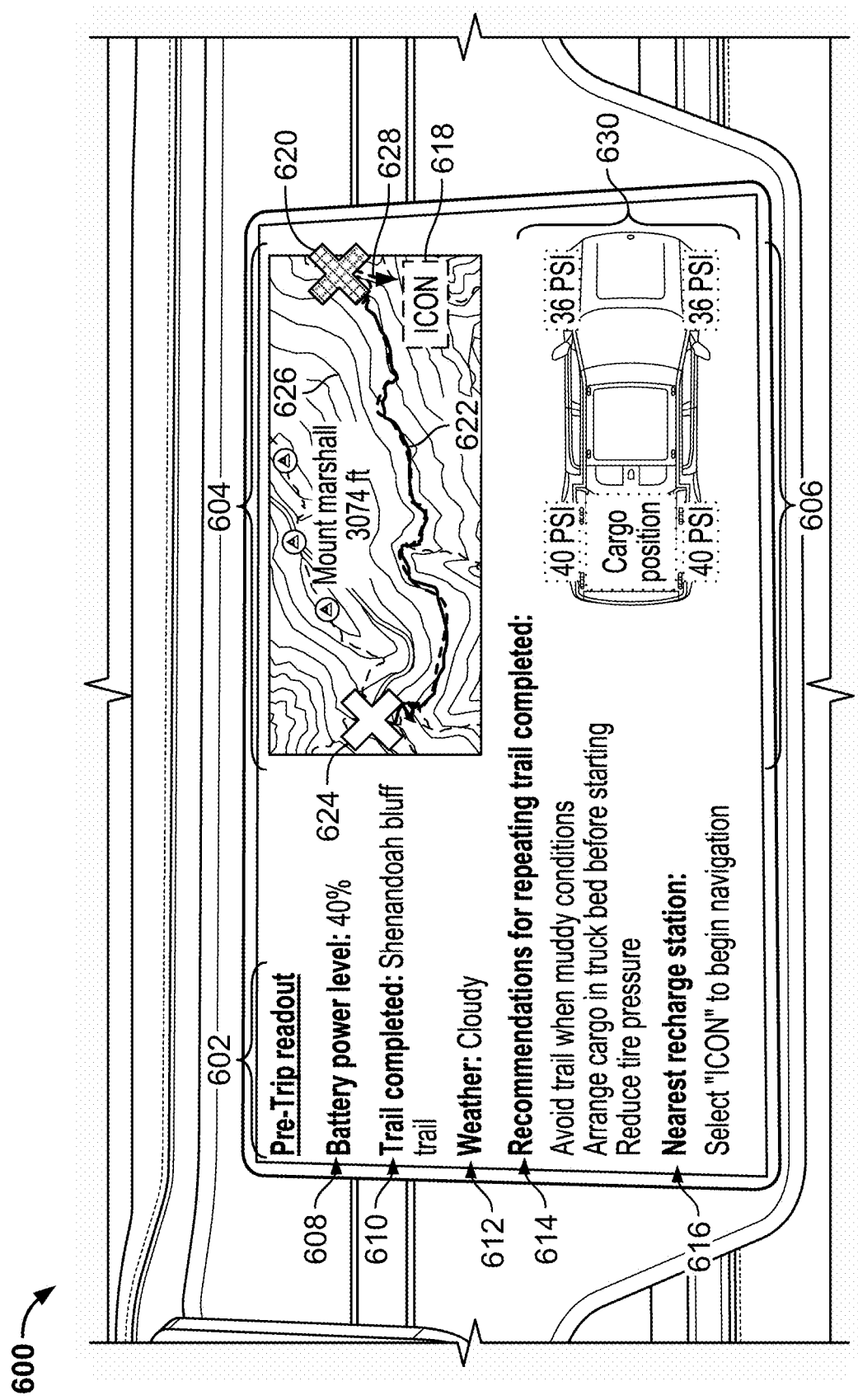
FIG. 6 depicts an example energy consumption coaching recommendation, in accordance with some embodiments of the disclosure.
Figure 7:
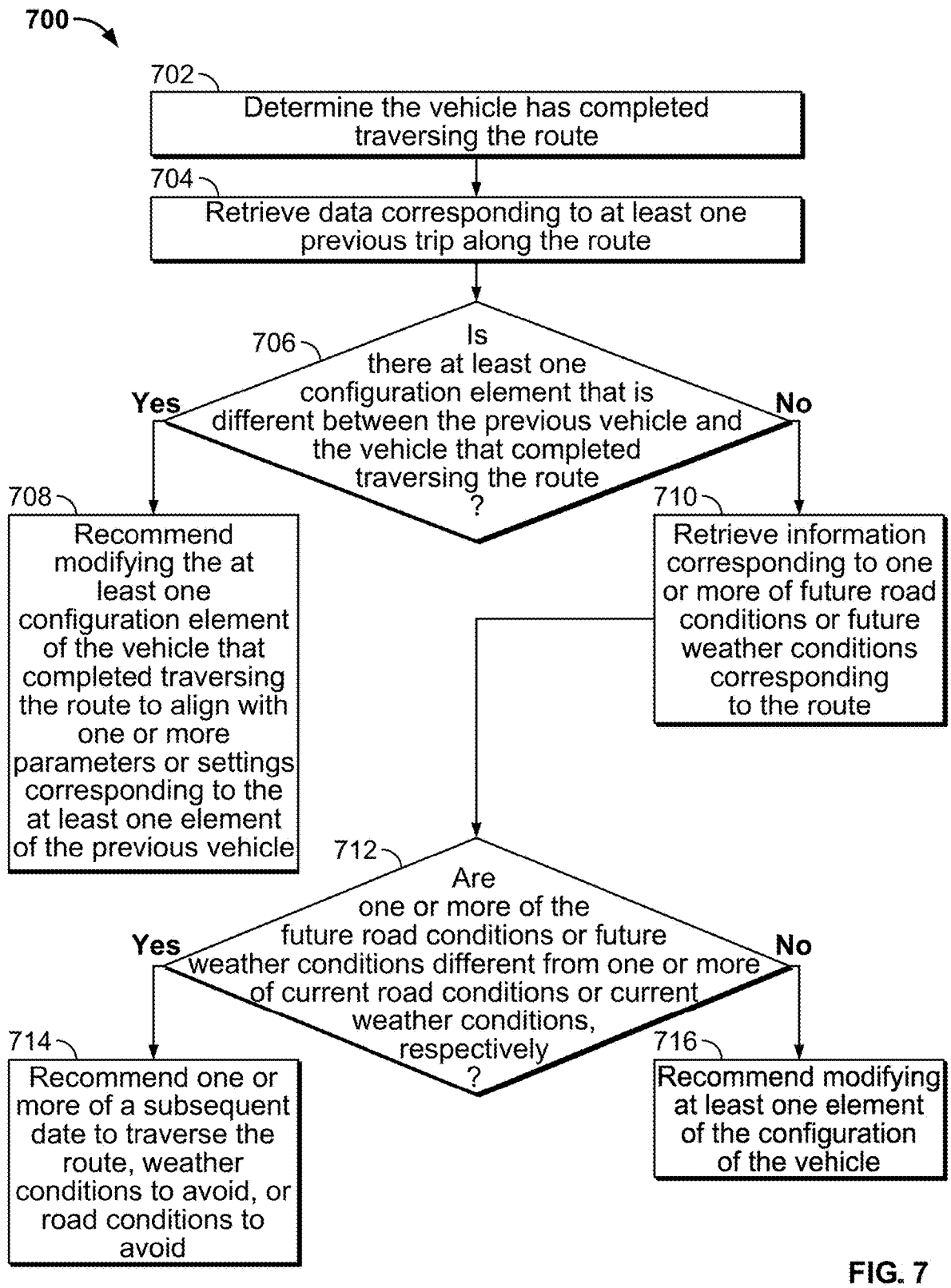
FIG. 7 is a flow chart representing an illustrative process for generating an example energy consumption coaching recommendation, in accordance with some embodiments of the disclosure.
Figure 8:
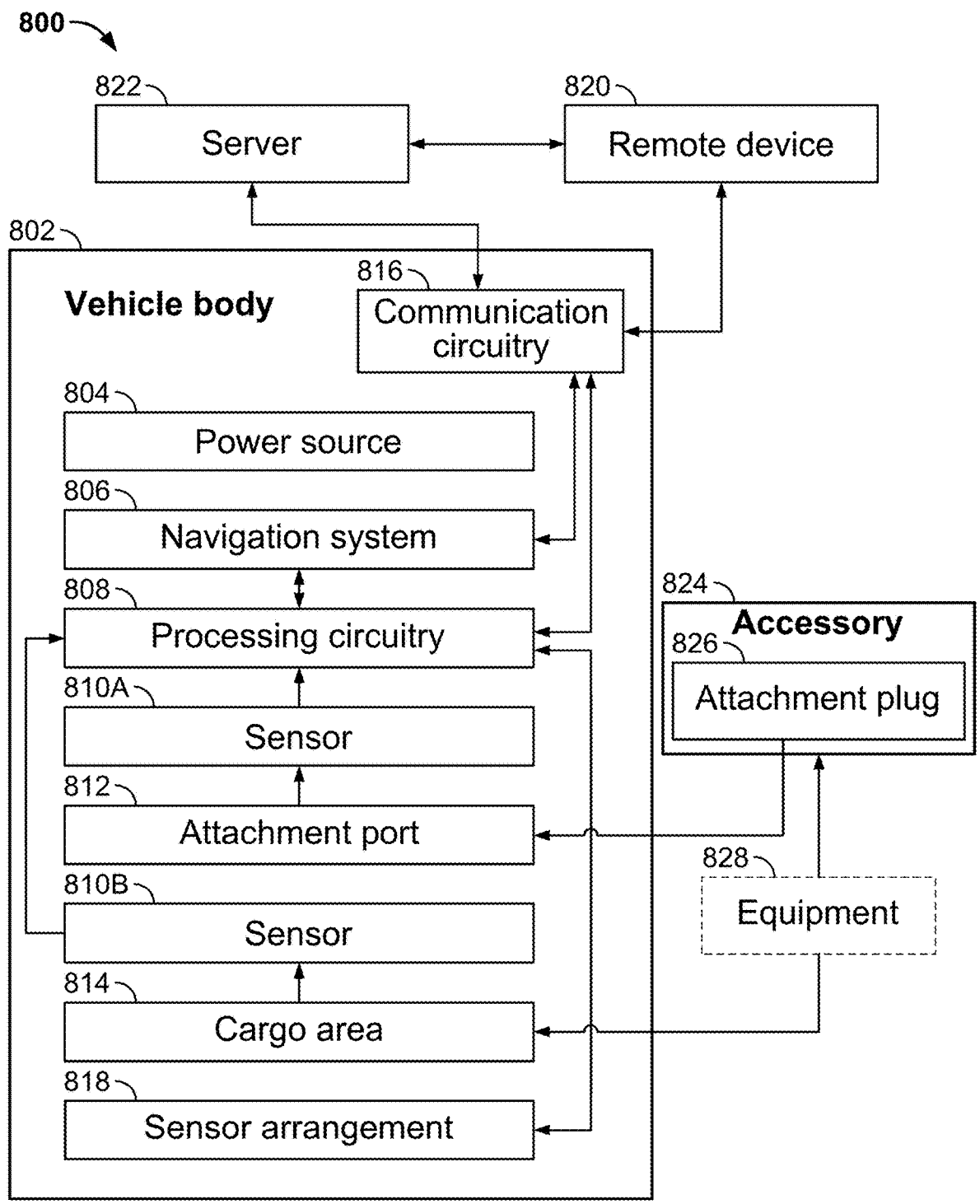
FIG. 8 is a block diagram of an example vehicle system, in accordance with some embodiments of the disclosure.
Figure 9:
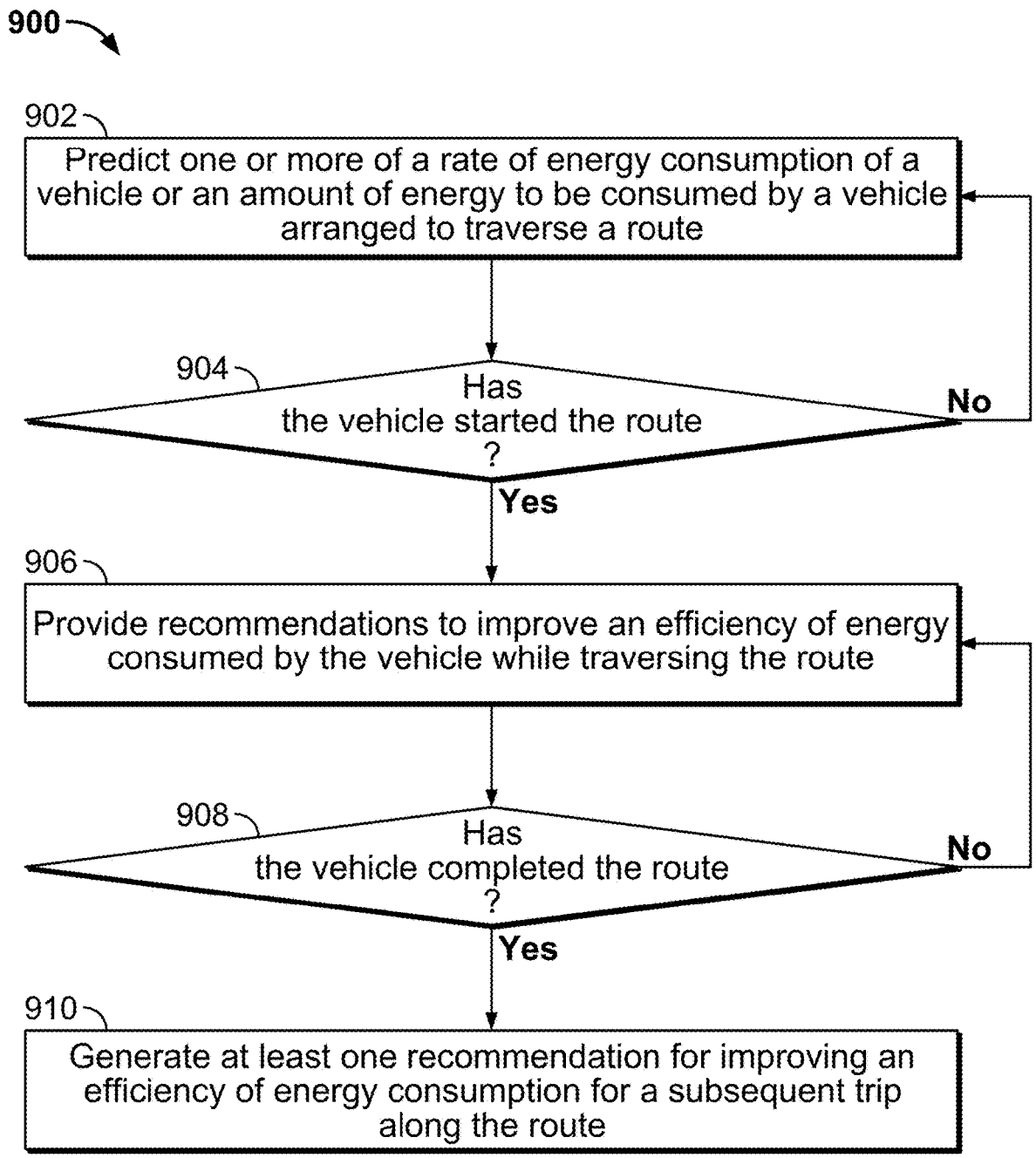
FIG. 9 is a flow chart representing an illustrative process for generating multiple readouts during different portions of a trip along a route, in accordance with some embodiments of the disclosure.

5) or energy consumption coaching recommendation 600 of FIG. 6 (e.g., as generated based on energy consumption coaching method 700 of FIG. 7). Additionally, or alternatively, system 800 of FIG. 8 depicts a vehicle system configured to execute one or more aspects of scenario 100 and method 900 of FIG. 9 depicts a method that, when executed, generates one or more of readouts 104, 106, or 108.

Scenario 100 includes vehicle 102 being arranged to traverse route 110. Vehicle 102 begins at location 112. Location 112 may correspond to one or more of a starting point of route 110 or a location where a driver or user of vehicle 102 requests an energy prediction report (e.g., energy prediction report 200) to determine whether vehicle 102 has enough energy available in vehicle 102 to traverse route 110 without needing to add more energy to vehicle 102 (e.g., without need to recharge a battery powering vehicle 102). A driver of vehicle 102 may, for example, drive to location 112 to start route 110 or may be at location 112 and may request a confirmation of whether vehicle 102 has enough stored energy to complete route 110. To request the report, a user may provide an input to either vehicle 102 or a device communicatively coupled to vehicle 102 (e.g., a personal mobile device configured to transmit and receive information or instructions to and from vehicle 102). The input may be a typed command or a selection of a button on a user interface (e.g., a touch screen or dashboard). In response to the input, vehicle 102 compiles information to generate readout 104. As shown in FIG. 1, readout 104 includes an indication of a battery power level, a trail corresponding to route 110 for vehicle 102 to traverse, a weather description, a trail condition description, and a likelihood that the trail will be completed based on one or more of the aforementioned elements of readout 104.

In some embodiments, readout 104 is generated based on crowdsourced data. For example, each time a driver completes a route or off-road trail using vehicle 102, or a vehicle configured to provide data based on a completed route, the driver may configure vehicle 102 to provide multiple data sets to be stored in a local or remote server for access by other off-road drivers seeking to improve respective energy prediction report for their respective vehicles. A first set of data provided by vehicle 102 may include the total amount of energy consumed by vehicle 102 after completing a route (e.g., route 110). The total amount of energy may, for example, be a percentage of a battery power that was discharge or may be a measure of amps consumed by vehicle 102. A second set of data provided by vehicle 102 may include a configuration of vehicle 102. The configuration related data may include one or more of a vehicle body type (e.g., sedan, sport utility vehicle, or truck), a powertrain configuration (e.g., two wheel drive or all wheel drive), a fuel source (e.g., gasoline, diesel, fuel cell, or electric battery powered), tire type (e.g., all-season, summer, winter, or with chains), or other adjustable settings of various components of vehicle 102 (e.g., one or more of ride height, drive mode, tire pressure). A third set of data either provided by vehicle 102 or retrieved by vehicle 102 (e.g., by searching and collecting data on a local or remote server) may include environmental conditions along route 110. For example, route 110 may have been subjected to rain, either earlier in a day or a day before. Route 110 may, therefore, remain wet overnight resulting in slick or muddy conditions. Road conditions along route 110 may be updated or modified based on current data (e.g., same day data or data within a few hours of a driver selecting route 110 as a route to traverse via vehicle 102). A combination of one or more of descriptions provided by those who maintain route 110, those who recently traverse route 110, or weather reports associated with locations along and around route 110 may be utilized to determine environmental conditions along or around route 110. A fourth set of data provided by vehicle 102 as part of generating readout 104 may include driving data associated with a user of vehicle 102 or other vehicles that have a similar configuration to vehicle 102. For example, vehicles may have one or more modules or processing units (e.g., an antilock braking system module that collects data from throughout a vehicle to provide numerical values associated with one or more of a vehicle speed, a vehicle brake event, or acceleration of a vehicle along different axes based on an arrangement of sensors throughout vehicle 102) configured to collect event data as a vehicle is driven.

In response to an input being received by vehicle 102 (or by a device communicatively coupled to vehicle 102), or in response to vehicle 102 approaching location 112 or a portion of route 110, the described data is retrieved by vehicle 102 via communication with one or more servers (e.g., either local or remote servers configured to transmit one or more of the described data points to vehicle 102). The one or more servers may first retrieve historical data associated with route 110 (e.g., vehicle configuration data of vehicles related to vehicle 102 by at least one aspect, environmental conditions when vehicles related to vehicle 102 have completed route 110, and driver behavior of the driver of a vehicle related to vehicle 102 as the driving behavior relates to one or more of route 110 or current conditions along around 110). Vehicle 102, after retrieving one or more of the aforementioned data points from the one or more servers, then provides configuration data of vehicle 102, current environmental conditions (e.g., as characterized by sensors on vehicle 102 or based on data retrieved by vehicle 102 relative to locations on or along route 110), and driver behavior data of the current driver of vehicle 102 (e.g., at least as the driver behavior data relates to one or more of current driving conditions along route 110 or past excursions along route 110 by the driver in vehicle 102 or vehicles of similar configurations to vehicle 102).

Either vehicle 102 or a server communicatively coupled to vehicle 102 then compares the historical data from other vehicles determined to relate to vehicle 102 (e.g., based on one or more configuration or trip data points), in order to calculate a compatibility score. The compatibility score may comprise a weighted average of datapoints in order to generate a detailed and accurate energy prediction report. The compatibility score computation is provided as an example in reference to method 300 of FIG. 3. Based on the compatibility score and data associated with successful completions of route 110, a trail completion likelihood may be generated on readout 104. Where these computations performed by a remote server or vehicle 102 indicate that vehicle 102 and the current driver are more likely than not to complete route 110 without needing to recharge or refuel vehicle 102 (e.g., the trail completion likelihood is greater than 50%), then readout 104 may include an indication of successful trail completion (e.g., a map of route 110 is generated to show where vehicle 102 is expected to finish such as at route end 116). Where these computations performed by a remote server or vehicle 102 indicate that vehicle 102 and the current driver are not likely to complete route 110 without needing to recharge or refuel vehicle 102 (e.g., the trail completion likelihood is equal to or less than 50%), then readout 104 may include an indication of failure to complete route 110 (e.g., a map of route 110 is generated to show where vehicle 102 is expected to finish such as at mid-trip position 114).

After receiving and reviewing readout 104, a driver of vehicle 102 may decide to traverse route 110 based on current vehicle configurations and an indication of likely successful completion of route 110. Vehicle 102 starts from location 102 and traverses along route 110 to mid-trip position 114. Mid-trip position 114 corresponds to a location along route 110 where either the driver of vehicle 102 provides an input requesting readout 106 or vehicle 102 detects conditions leading to generation of readout 106. Readout 106 may be generated using one or more steps described in reference to method 500 of FIG. 5. For example, the input may include one or more of a selection of an option or a selection of a button on one or more of a remote device, a dashboard, or a touch screen of vehicle 102 or a device communicatively coupled to vehicle 102. Conditions leading to generation of readout 106 may include a reduction in a likelihood that vehicle 102 has enough stored energy to complete route 110. Further to the example shown in FIG. 1, the trail completion likelihood as shown in readout 104 indicates a 95% likelihood that vehicle 102 can complete route 110 without recharging a power source. In the event a driver of vehicle 102 traverses route 110 up to mid-trip position 114 in a manner that reduces the trail completion likelihood from 95% (e.g., by generating more wheel slip than anticipated during generation of readout 104 or by increasing a rate of energy consumption by going faster than recommended along route 110) to a likelihood less than 95% (e.g., more than a 1% deviation in likelihood of completion), readout 106 may be generated on a display of vehicle 102.

Readout 106 may include one or more of a wheel slip energy loss report or a hydrodynamic energy loss report. For example, the wheel slip energy loss report provides a measurement of an amount of energy consumed spinning the wheels of vehicle 102 without translating vehicle 102 along route 110 (e.g., a percentage of a battery charge lost or an amount of amps discharged without translation of vehicle 102). In another example, the hydrodynamic energy loss report provides a measurement of energy discharged by a power source of vehicle 102 while traversing a position of route 110 that either requires traversing a flooded portion of route 110 or a muddy portion of route 110 (e.g., as compared to a predicted amount of energy to be used by vehicle 110 if the flooded or muddy portion of route 110 is not present). Readout 106 may or may not display one or more of the wheel slip energy loss report or the hydrodynamic energy loss report. Readout 106 includes at least one recommendation to improve trail completion likelihood (e.g., to improve an efficiency of energy consumption by vehicle 102. For example, as shown in FIG. 1, the recommendation may include one or more of a recommendation to modify (e.g., increase) a current tire pressure of vehicle 102 or a recommendation to relocate cargo to a different part of vehicle 102 (e.g., move all cargo to truck bed to increase weight over a rear axle to increase friction and grip of rear wheels or tires).

Once vehicle 102 completes route 110 by reaching route end 116, readout 108 may be generated based on one or more of a determination that vehicle 102 has completed route 110 or a user provides an input to vehicle 102 to generate readout 108. Readout 108 may be generated based on the execution of one or mores steps of method 700 of FIG. 7. In some embodiments, readout 108 may include one or more of one or more of the wheel slip energy loss report or the hydrodynamic energy loss report described in reference to readout 106. Additionally, or alternatively, readout 108 provides one or more of a recommendation for repeating completion of trail 110 with improved energy consumption efficiency or a location and route to a nearest recharge station. As shown in FIG. 1, icon 118 provides a relative location to vehicle 102 of a nearest charging station. Icon 118 may be generated automatically based on a completion of route 110 or based on an amount of power remaining in a power source of vehicle 102 (e.g., if the amount of stored energy is 50% or less of a total stored power capacity of vehicle 102, then icon 118 may be generated for display with a planned route from route end 116).

Figure 2:
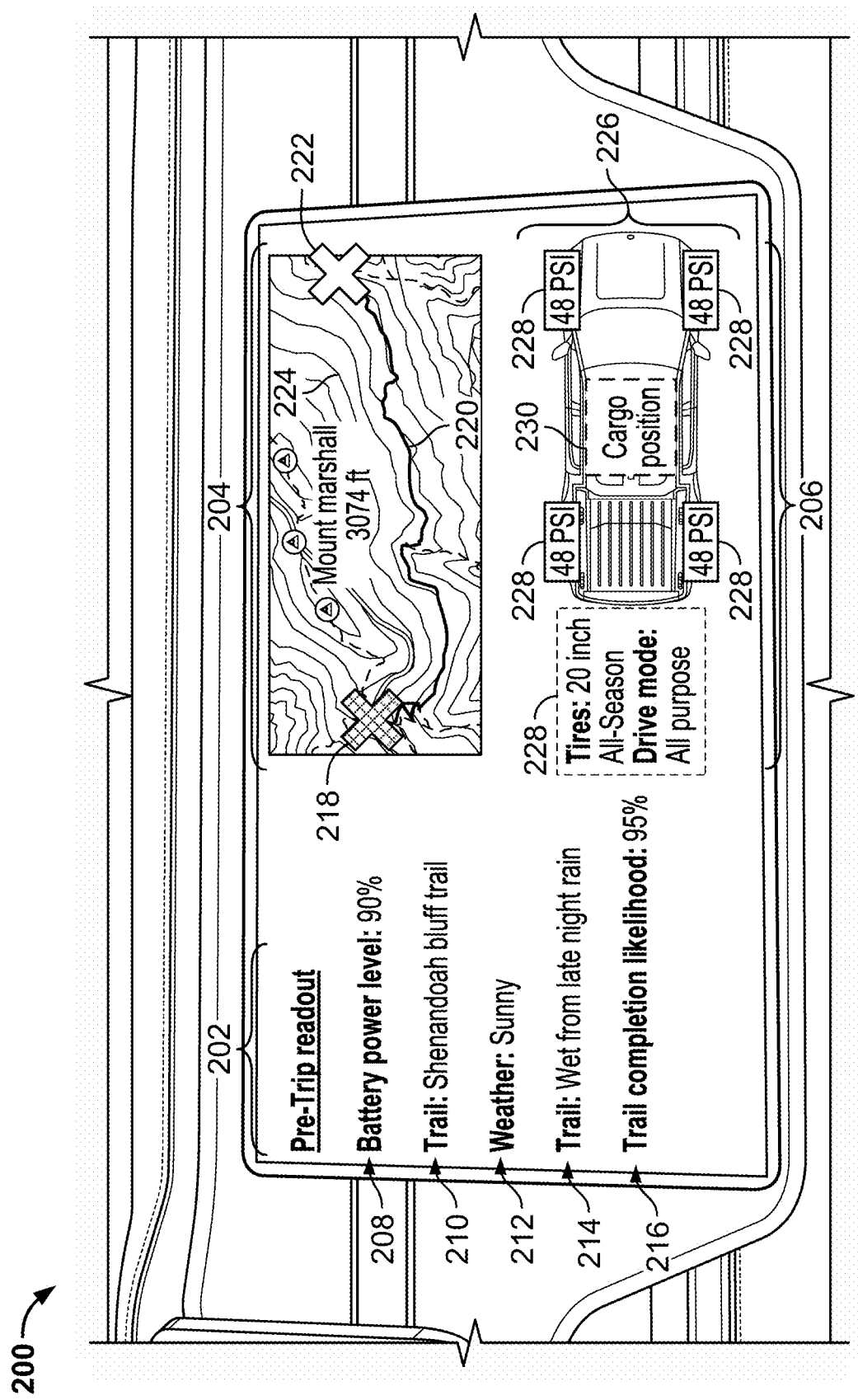
FIG. 2 depicts an example energy prediction report, in accordance with some embodiments of the disclosure.

FIG. 2 depicts energy prediction report 200, in accordance with some embodiments of the disclosure. Energy prediction report 200 may be generated in response to the execution of scenario 100 of FIG. 1, in whole or in part, and may be generated based on method 300 of FIG. 3. Additionally, or alternatively, system 800 of FIG. 8 depicts a vehicle system configured to execute one or more aspects of scenario 100 and method 900 of FIG. 9 depicts a method that, when executed, generates energy prediction report 200 (e.g., corresponding to readout 104 of FIG. 1).

Energy prediction report 200 corresponds to readout 104 of FIG. 1 and is generated by a vehicle (e.g., vehicle system 800 of FIG. 8) to provide a user with an indication of whether there is enough stored energy in the vehicle to complete a route (e.g., an off-road trail or a stretch of road with a defined start and end). The determination of whether there is enough energy may depend on one or more of whether the driver has arranged the vehicle at the start of the route, whether the driver needs to travel a distance to get to the start of the route, weather conditions along the route, road conditions along the route, or a current vehicle configuration (e.g., as described in reference to readout 104 of FIG. 1).

Energy prediction report 200 includes pre-trip information field 202, map field 204, and vehicle configuration field 206. Pre-trip information field 202 provides a plurality of information that would inform a driver of a vehicle configured to generate energy prediction report 200 of whether the vehicle has enough stored energy to complete a route defined by the driver. For example, battery power level 208 is shown as providing a battery charge percentage (e.g., relative to a full charge that would be reported as 100% power level). Additionally, a trail name is generated in trail 210 based on a route selected by the driver. Weather 212 indicates current weather conditions along the trail populating trail 210. Trail description 214 is populated with a description of the road conditions along the trail identified via trail 210. Pre-trip information field 202 also includes trail completion likelihood 216. As shown in FIG. 2, trail completion likelihood may be represented by a percent likelihood of completion or some other value or visual indicator (e.g., a graph, a chart, or color coded icon) in order to provide a user with a clear indication of whether a vehicle system determined the current vehicle with the current vehicle power level can complete the route (e.g., trail 210) based on one or more of current trail or route conditions (e.g., one or more of weather or road conditions) or current driver behavior (e.g., as it relates to one or more of the current vehicle configuration, the current route, or current route conditions). The computations related to the generation of trail completion likelihood 216 are described with examples in reference to process block 312 of FIG. 3.

Map field 204 provides a driver of a vehicle configured to generate energy prediction report 200 with a visual indication of current location 218, route 220, and route end 222 on map 224. Map 224 may be generated based on images provided by a navigation system (e.g., navigation system 806 of FIG. 8), in response to the driver inputting a route for traversing with the vehicle. The images may be one or more of two-dimensional images, three-dimensional images, satellite generate imagery, or predesigned map icons. Current location 218 is shown as a patterned shaped and may comprise a different icon from an icon indicating route end 222. Route end 222 is shown as a blank shape. Route 220 is a highlighted portion of map 224 providing a visual indication of the route selected for generating energy prediction report 200.

Vehicle configuration field 206 provides visual indications of a current configuration of one or more elements or attributes of a vehicle configured to generate energy prediction report 200 and arranged to traverse along route 220. Vehicle configuration field 206 includes vehicle graphic 226 and text field 228. Vehicle graphic 226 is shown as a top view of the vehicle. Vehicle graphic 226 may include any visible orientation of the vehicle and is shown as indicating current tire pressures 228 (e.g., as detected by one or more vehicle system sensors) and cargo position 230. Cargo position 230 may be input by a driver (e.g., based on selection or dragging of a graphic on a touch screen interface) or may be detected by one or more sensors in the vehicle (e.g., as described in reference to vehicle system 800 of FIG. 8). Text field 228 is shown as providing a text description of tires and a current drive mode of the vehicle (e.g., All Purpose). In some embodiments one or more elements of text field 228 may be one or more of modifiable by a user, based on factory settings when the vehicle is manufacturers, or detected via one or more sensors arranged throughout the vehicle system.

Figure 3:
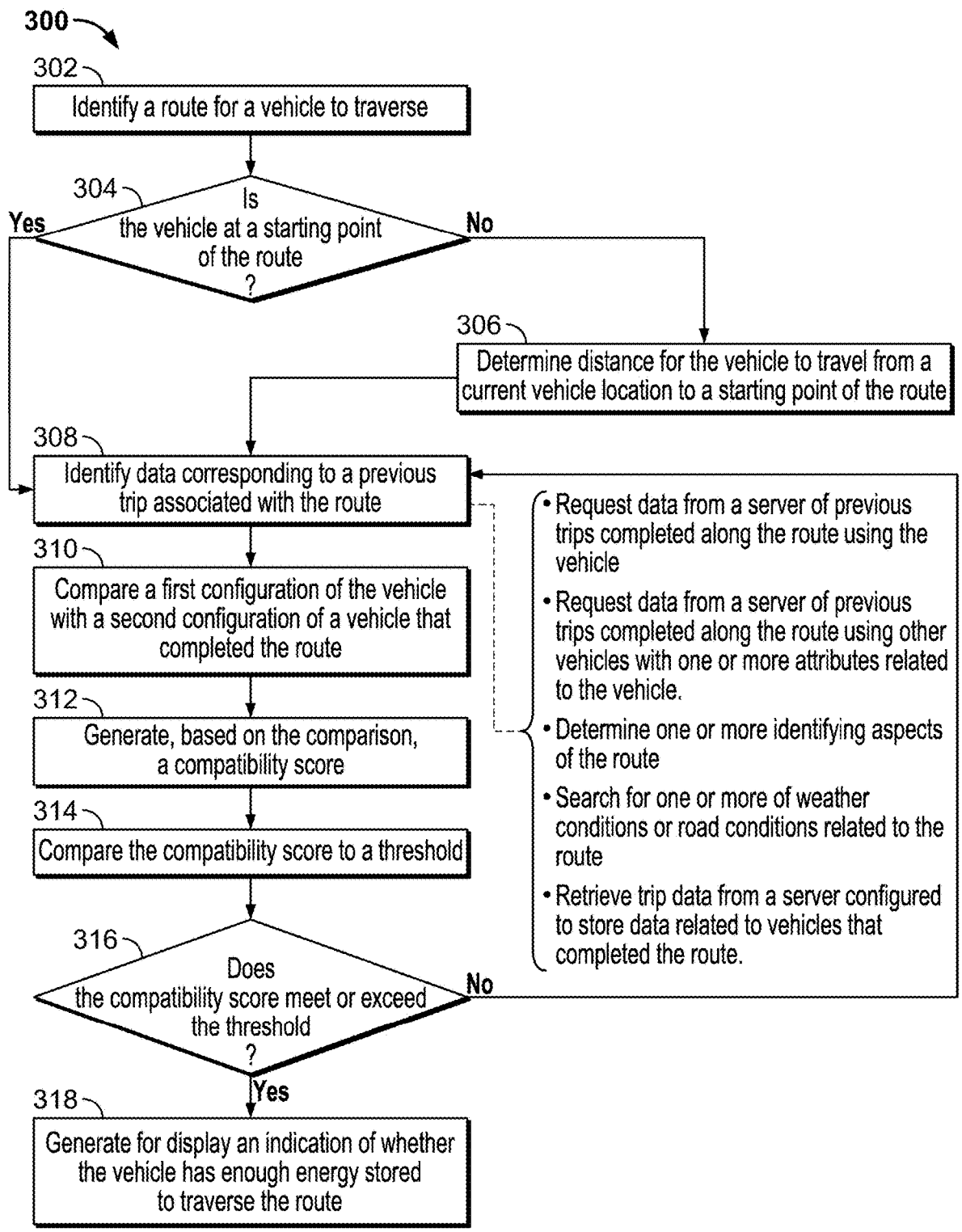
FIG. 3 is a flow chart representing an illustrative process for generating an example energy prediction report, in accordance with some embodiments of the disclosure.

FIG. 3 depicts a flow chart representing method 300 for generating energy prediction report 200 of FIG. 2, in accordance with some embodiments of the disclosure. Method 300 may be executed, in whole or in part, based on the execution of scenario 100 of FIG. 1, in whole or in part. Additionally, or alternatively, system 800 of FIG. 8 depicts a vehicle system configured to execute one or more aspects of scenario 100, method 300 of FIG. 3, and method 900 of FIG. 9 that each provide a means of generation of energy prediction report 200 (e.g., corresponding to readout 104 of FIG. 1).

At process block 302, a route for a vehicle to traverse is identified. For example, one or more of navigation system 806, processing circuitry 808, remote device 820, or server 822 of FIG. 8 may be utilized by a driver of a vehicle comprised of one or more of these elements to search for a trail (e.g., off-road trail marked and searchable via one or more servers) to traverse or may be used to input a start and end of a route to traverse (e.g., a portion of a road accessible by the vehicle. If, at 304, the vehicle is determined to not be at a starting point of the route (NO at 304), then, at 306, a distance for the vehicle to travel from a current vehicle location to a starting point of the route. At 308, data corresponding to a previous trip associated with the route is identified (e.g., via server 822 or FIG. 8 or one or more of the elements of FIG. 8 configured to identify or retrieve data via server 822). If, at 304, the vehicle is determined to be at a starting point of the route (YES at 304), then, at 308, data corresponding to a previous trip associated with the route is identified.

Identifying the data at 308 may include one or more of the following actions by one or more elements of vehicle system 800 of FIG. 8. A first exemplary action may include requesting data from a server of previous trips completed along the route using the vehicle that is identifying a route to traverse. A second exemplary action may include requesting data from a server of previous trips completed along the route using other vehicles with one or more attributes related to the vehicle. The server (e.g., server 822 of FIG. 8) may include one or more data sets based on user or vehicle profiles from a single or multiple manufacturers that has been voluntarily uploaded based on various vehicle communication and data transmitting settings. A third exemplary action may include determining one or more identifying aspects of the route (e.g., one or more of a trail name, a trail start location, a trail end location, or a trail rating). A fourth exemplary action may include searching for one or more of weather conditions or road conditions related to the route. For example, one or more servers may store daily weather reports or road condition reports of various portions along the route. A fifth exemplary action may include retrieving trip data from a server configured to store data related to the vehicle that have previously completed the route.

At 310, a first configuration of the vehicle that is to traverse the identified route is compared with a second configuration of a vehicle that completed the route (e.g., at a previous time or previous date). The second configuration may be a configuration of the same vehicle or of a vehicle with related configuration aspects (e.g., one or more of same tire size, same body type, same wheel based, or any physical attribute or element of a vehicle that is stored in relation to trip data along the route). At 312, a compatibility score is generated based on the comparison. The compatibility score may be generated based on one or more of a weighted average or other statistics based computation to quantify similarities between one or more attributes or elements of the first configuration of the vehicle that is to traverse the identified route and the second configuration of the vehicle that completed the route. For example, where one or more attributes or elements of the configurations match, a higher weight is applied to the data associated with route completion than data where there are no matches of elements or attributes (e.g., a factor of 1). If there are no direct matches and only related configuration elements or attributes (e.g., tire size is the same, but tire treads are different), a lower weight is applied to the data (e.g., a factor of 0.25). Each of these weighted data points are then combined (e.g., via any suitable statistical computation means) to generate one or more of a predicted energy consumption total, predicted energy consumption rate, or a likelihood the current vehicle in its current configuration can complete the trip.

At 314, the compatibility score is compared to a threshold (e.g., the threshold corresponds to a likelihood of route completion that is at least 50% based a comparison of one or more of current route conditions to route completed conditions, current vehicle configuration elements to past successful completion vehicle configuration elements, or current driver habits to past driver habits who have completed the route in similarly configured vehicles in similar route or weather conditions). If, at 316, the compatibility score meets or exceeds the threshold (YES at 316), then an indication is generated at 318 for display of whether the vehicle has enough energy stored to traverse the route (e.g., one or more of an indication of a probability of route completion based on a prediction of how a current driver with drive the vehicle along the route in the current route conditions or an indication of a current stored energy level to a preferred charge level). If, at 316, the compatibility score does not meet or exceed the threshold (NO at 316), then data corresponding to a previous trip associated with the route is identified at 308. This loop may continue until a configuration is identified to recommend to the driver how best to modify their current vehicle to complete the route. This loop may also continue until the driver fully charges their vehicle or charges their vehicle above a minimum recommended charge for completing the route. Additionally, or alternatively, this loop may stop in response to the driver starting the route or a recommendation is generated that the driver should take their vehicle along an alternative route as there is not enough statistical information to coach the driver into completing the route.

Figure 4:
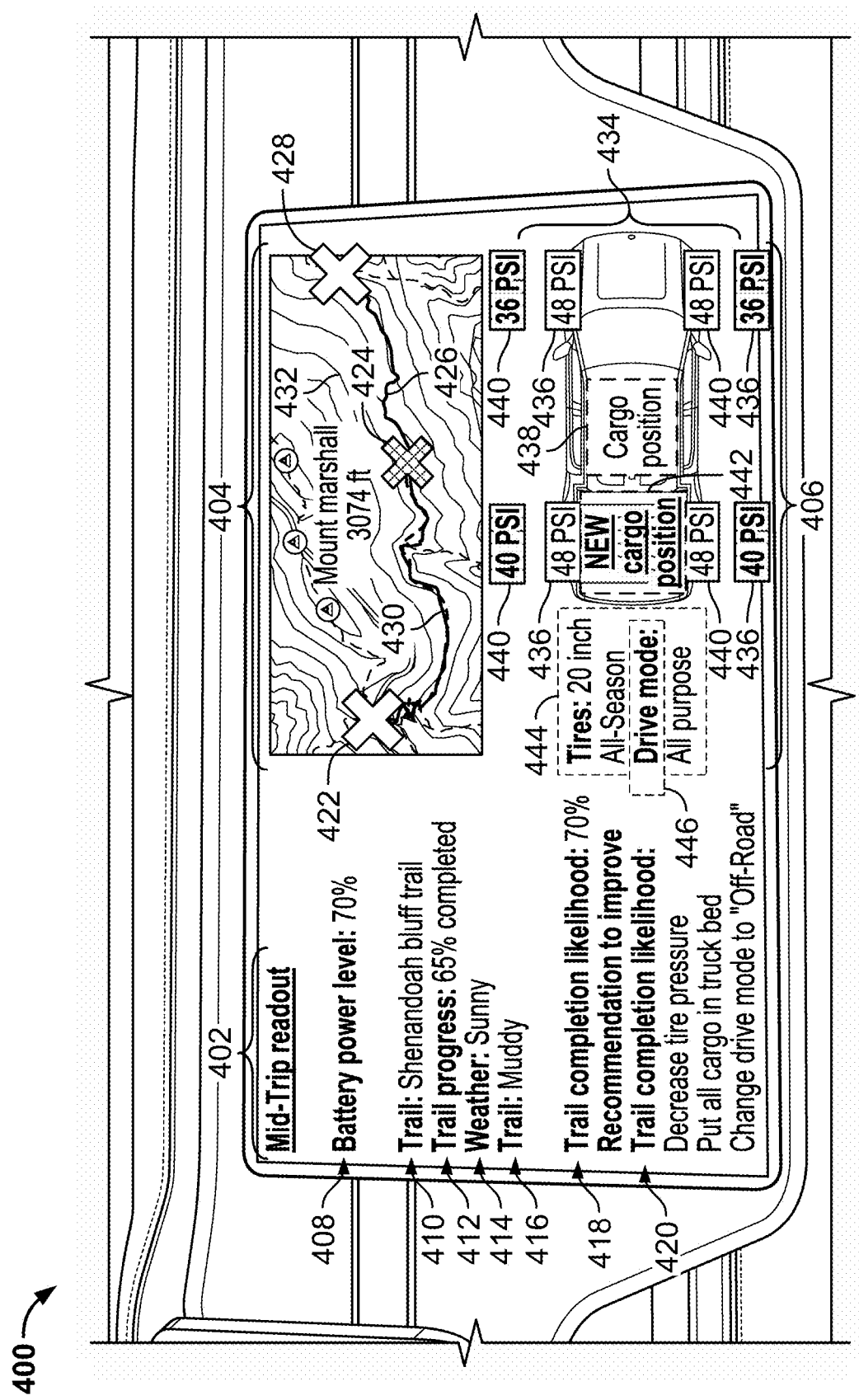
FIG. 4 depicts an example energy consumption report, in accordance with some embodiments of the disclosure.

FIG. 4 depicts energy consumption report 400, in accordance with some embodiments of the disclosure. Energy consumption report 400 may be generated in response to the execution of scenario 100 of FIG. 1, in whole or in part (e.g., after vehicle 100 departs location 112 and traverses route 110 towards route end 116), and may be generated based on method 500 of FIG. 5. Additionally, or alternatively, system 800 of FIG. 8 depicts a vehicle system configured to execute one or more aspects of scenario 100 and method 900 of FIG. 9 depicts a method that, when executed, generates energy consumption report 400 (e.g., corresponding to readout 106 of FIG. 1).

Energy consumption report 400 corresponds to readout 106 of FIG. 1 and is generated by a vehicle (e.g., vehicle system 800 of FIG. 8) to provide a user with one or more recommendations on how to complete a route already started by providing one or more modifications to a current vehicle configuration. The determination of whether there is enough energy may depend on one or more of weather conditions along the route, road conditions along the route, driver behavior along the route (e.g., how the driver is using the vehicle), or a current vehicle configuration (e.g., as described in reference to readout 106 of FIG. 1).

Energy consumption report 400 includes mid-trip information field 402, map field 404, and vehicle configuration field 406. Mid-trip information field 402 provides a plurality of information that would inform a driver of a vehicle configured to generate energy consumption report 400 of whether the vehicle has enough stored energy to complete a route defined by the driver. For example, current battery power level 408 is shown as providing a battery charge percentage (e.g., relative to a full charge that would be reported as 100% power level) as a result of the driver using the vehicle to traverse the route. Additionally, a trail name is generated in trail 410 based on a route selected by the driver and that is being traversed by the driver via the vehicle. Trail progress 412 indicates an amount of trail 410 that has been traversed. A shown in FIG. 4, the amount is depicted as a percent of the trail completed. In some embodiments, the amount depicted may correspond to one or more of a distance travelled along the route or a distance remaining along the route (e.g., to get from a current location to a trail or route end). Weather 414 indicates current weather conditions along the trail populating trail 410. Trail description 416 is populated with a description of the road conditions along the trail identified via trail 410. Mid trip information field 402 also includes trail completion likelihood 418. As shown in FIG. 4, trail completion likelihood may be represented by a percent likelihood of completion or some other value or visual indicator (e.g., a graph, a chart, or color coded icon) in order to provide a user with a clear indication of whether a vehicle system determined the current vehicle with the current vehicle power level can complete the route (e.g., trail 410) based on one or more of current trail or route conditions (e.g., one or more of weather or road conditions) or current driver behavior (e.g., as it relates to one or more of the current vehicle configuration, the current route, or current route conditions). The computations related to the generation of trail completion likelihood 418 are described with examples in reference to process block 312 of FIG. 3. Recommendations 410 are also generated for display as part of mid trip information field 402 to provide one or more recommendations for modifying a vehicle configuration characterized by one or more aspects of vehicle configuration field 406.

Map field 404 provides a driver of a vehicle configured to generate energy consumption report 400 with a visual indication of route start 422, current location 424, route 426, route end 428, and route progress 430 on map 432. Map 432 may be generated based on images provided by a navigation system (e.g., navigation system 806 of FIG. 8), in response to the driver inputting a route for traversing with the vehicle. The images may be one or more of two-dimensional images, three-dimensional images, satellite generate imagery, or predesigned map icons. Current location 424 is shown as a patterned shaped and may comprise a different icon from an icon indicating route start 422 or route end 428. Route start 422 and route end 428 are both shown as a blank shape. Route 426 is a highlighted portion of map 432 providing a visual indication of the route selected for generating energy consumption report 400. Route progress 430 provides a modified visual indication along route 426 to provide a driver of a vehicle configured to generate energy consumption report 400 of their current progress along route 426 and may be used to provide other information such as distance progressed or distance remaining along route 426. For example, route 426 may be highlighted to contrast from route 432 and route progress 430 may comprise a different color from route 426 to indicate an amount of route 426 traversed by the vehicle.

Vehicle configuration field 406 provides visual indications of a current configuration of one or more elements or attributes of a vehicle configured to generate energy consumption report 400 and arranged to traverse along route 426. Vehicle configuration field 406 includes vehicle graphic 434 and text field 444. Vehicle graphic 434 is shown as a top view of the vehicle. Vehicle graphic 434 may include any visible orientation of the vehicle and is shown as indicating current tire pressures 436 (e.g., as detected by one or more vehicle system sensors) and current cargo position 438. Current cargo position 438 may be input by a driver (e.g., based on selection or dragging of a graphic on a touch screen interface) or may be detected by one or more sensors in the vehicle (e.g., as described in reference to vehicle system 800 of FIG. 8). Additionally, vehicle graphic 434 includes recommended tire pressures 440 and recommended new cargo position 442. Recommended tire pressures 440 and recommended new cargo position 442 may be generated or computed based on one or more factors described in reference to this disclosure for improving trail completion likelihood 418. Graphics or icons generated to represent one or more of recommended tire pressures 440 or recommended new cargo position 442 may comprise contrasting stylings from current tire pressures 436 or current cargo position 438, respectively. For example, the current icons or graphics may be a subdued color tone (e.g., a dark blue), and the recommended icons or graphics may be an apparent color tone (e.g., a scarlet red). Text field 444 is shown as providing a text description of tires and a current drive mode of the vehicle (e.g., All Purpose). In some embodiments one or more elements of text field 436 may be one or more of modifiable by a user, based on factory settings when the vehicle is manufacturers, or detected via one or more sensors arranged throughout the vehicle system. As shown in FIG. 4, text field 44 also includes indicator 446 which highlights a selectable "Drive Mode" option based on one or more recommendations in recommendations 410 (e.g., since the current drive mode is depicted as "All Purpose" and recommendations 410 include a change to drive mode "Off-Road," indicator 446 is generated to highlight the current drive mode to provide a user with a selectable option to modify the vehicle configuration).

Figure 5:
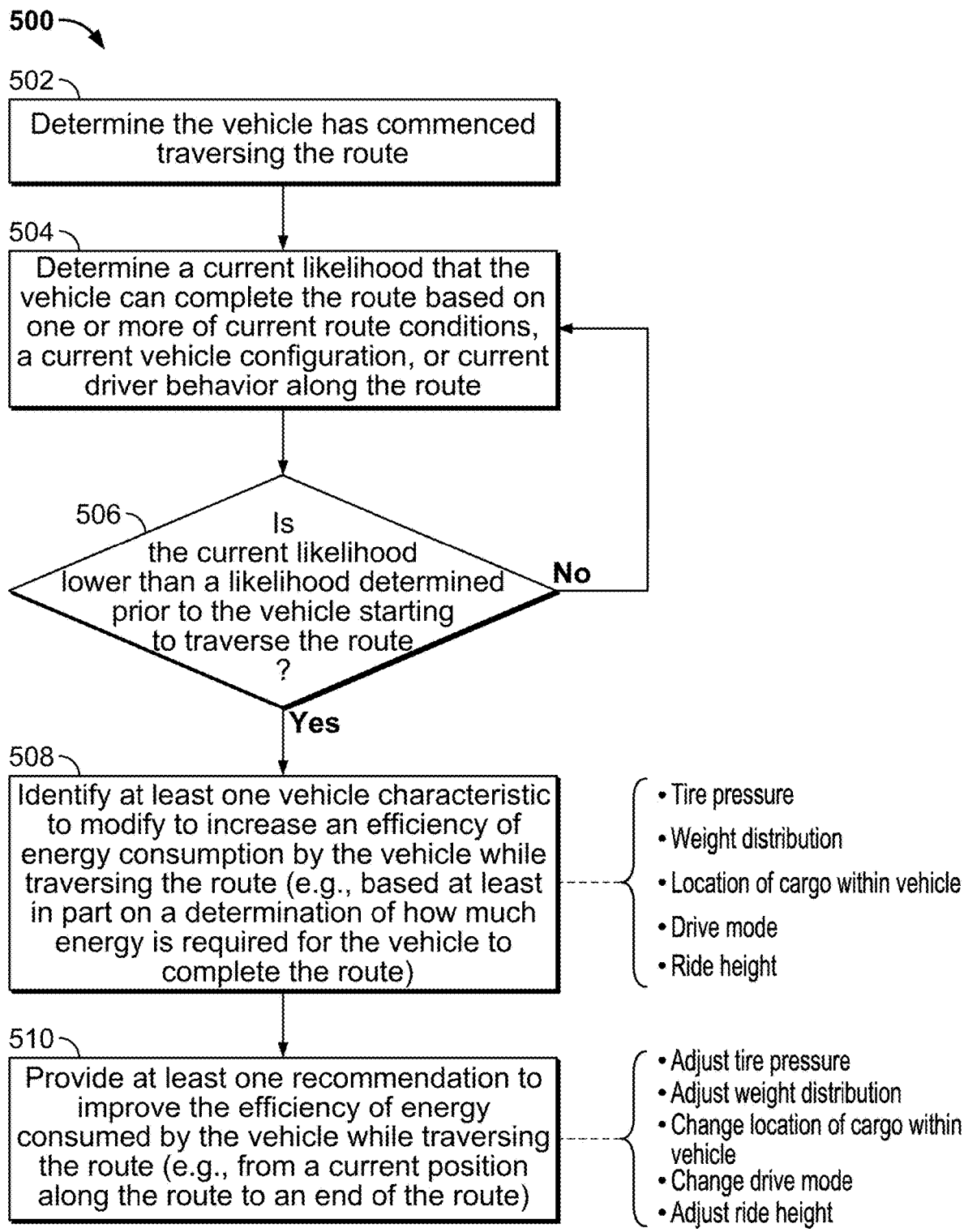
FIG. 5 is a flow chart representing an illustrative process for generating an example energy consumption report, in accordance with some embodiments of the disclosure.

FIG. 5 depicts a flow chart representing method 500 for generating energy consumption report 400 of FIG. 4, in accordance with some embodiments of the disclosure. Method 500 may be executed, in whole or in part, based on the execution of scenario 100 of FIG. 1, in whole or in part. Additionally, or alternatively, system 800 of FIG. 8 depicts a vehicle system configured to execute one or more aspects of scenario 100, method 500 of FIG. 5, and method 900 of FIG. 9 that each provide a means of generation of energy consumption report 400 (e.g., corresponding to readout 106 of FIG. 1).

At 502, a determination is made that the vehicle has commenced traversing the route. For example, one or more of processing circuitry 808 or sensor arrangement 818 may transmit data indicative that the vehicle has reached a starting point of the route and has started traversing along the route. At 504, a current likelihood that the vehicle can complete the route based on one or current route conditions, a current vehicle configuration, or current driver behavior along the route (e.g., one or more of speed, braking habits, steering efforts, or throttle engagement rate). The current likelihood may be computed based on a weighted average of varying variables (e.g., as described in reference to process block 312 of FIG. 3). If, at 506, the current likelihood that the vehicle can complete the route is not lower than a likelihood determined prior to the vehicle starting to traverse the route (NO at 506), then process block 504 is revisited to recompute a new current likelihood based on progress the driver has made along the route between a current processing loop of method 500 and a preceding processing loop of method 500.

If, at 506, the current likelihood that the vehicle can complete the route is lower than a likelihood determined prior to the vehicle starting to traverse the route (YES at 506), then at least one vehicle characteristic to modify is identified at 508 to increase an efficiency of energy consumption by the vehicle while traversing the route (e.g., based at least in part on a determination of how much energy is required for the vehicle to complete the route). Some example parameters which may be adjusted include one or more of tire pressure, weight distribution of the vehicle, the location of cargo within the vehicle, different drive modes available (e.g., one or more of "All Purpose" or "Off-Road"), or ride height of the vehicle (e.g., via air suspension or mechanically adjusting hardpoints of the vehicle). At 510, at least one recommendation to improve the efficiency of energy consumed by the vehicle while traversing the route is provided (e.g., from a current position along the route to an end of the route). The recommendation may include one or more of a tire pressure modification recommendation, a change in weight distribution of the vehicle recommendation, an instruction or recommendation for modification of the location of cargo within the vehicle, a recommendation for a different drive mode (e.g., change from "All Purpose" to "Off-Road"), or a recommendation to adjust a ride height of the vehicle (e.g., via air suspension settings or mechanically adjusting hardpoints of the vehicle).

FIG. 6 depicts energy consumption coaching recommendation 600, in accordance with some embodiments of the disclosure. Energy consumption coaching recommendation 600 may be generated in response to the execution of scenario 100 of FIG. 1, in whole or in part (e.g., after vehicle 100 arrives at route end 116), and may be generated based on method 700 of FIG. 7. Additionally, or alternatively, system 800 of FIG. 8 depicts a vehicle system configured to execute one or more aspects of scenario 100 and method 900 of FIG. 9 depicts a method that, when executed, generates energy consumption coaching recommendation 600 (e.g., corresponding to readout 108 of FIG. 1).

Energy consumption coaching recommendation 600 corresponds to readout 108 of FIG. 1 and is generated by a vehicle (e.g., vehicle system 800 of FIG. 8) to provide a user with at least one recommendation to improve an efficiency of energy consumption by the vehicle during a subsequent trip along the completed route (e.g., an off-road trail or a stretch of road with a defined start and end). The generation of the one or more recommendations may depend on one or more of weather conditions along the route, road conditions along the route, a current vehicle configuration, previous vehicle configurations, or driver behavior changes (e.g., as described in reference to readout 108 of FIG. 1).

Energy consumption coaching recommendation 600 includes post-trip information field 602, map field 604, and vehicle configuration field 606. Post-trip information field 602 provides a plurality of information that would inform a driver of a vehicle configured to generate energy consumption recommendation 600 of conditions associated with the completed trip including a post-trip recharge station location as well as other coaching recommendations for subsequent trips along the route to improve an efficiency of energy consumption by the vehicle while traversing the route. For example, battery power level 608 is shown as providing a battery charge percentage (e.g., relative to a full charge that would be reported as 100% power level). Additionally, a trail name is generated in trail completed 610 based on a route selected by the driver. Weather 612 indicates current weather conditions along the trail populating trail completed 610. Also shown are recommendations 614 and recharge station indication 616. Recommendations 614 are generated based on one or more of data retrieved, data processed, or computations completed by processing circuitry (e.g., processing circuitry 808 of FIG. 8), that indicates the completion of trail completed 610 could have occurred with a higher energy consumption efficiency. For example, one or more vehicle sensors may collect data that during the execution of the route, one or more tires continuously slipped along the route preventing a direct translation of power provided by a powertrain to grip of tires leading to translation of wheels and the vehicle along the route. As shown in FIG. 6, example recommendations may include one or more of a recommendation of trail conditions to avoid (e.g., based on one or more of driver skill, driver past behavior, or a current vehicle configuration), a recommendation of where to store cargo while traversing the route, or a recommendation for a vehicle parameter change (e.g., reducing tire pressure). Recharge station indication 616 provides the driver with directions to select icon 618 of map field 404 to start navigation to a nearest recharge station in order to provide the user with an accessible route to a recharge station based on a current battery power level (e.g., as indicated by battery power level 608).

Map field 604 provides a driver of a vehicle configured to generate energy consumption coaching recommendation 600 with a visual indication of current location 620 (e.g., the route end), completed route 622, route start 624, and recharge station route 628 on map 626. Map 626 may be generated based on images provided by a navigation system (e.g., navigation system 806 of FIG. 8), in response to the driver inputting a route for traversing with the vehicle. The images may be one or more of two-dimensional images, three-dimensional images, satellite generate imagery, or predesigned map icons. Current location 620 is shown as a patterned shaped and may comprise a different icon from an icon indicating route start 624. Route start 624 is shown as a blank shape. Completed route 622 is a highlighted portion of map 626 providing a visual indication of the route completed, resulting in data generating energy consumption coaching recommendation 600. Additionally, map field 604 includes icon 618 which is selectable based on the generation for display of recharge station indication 616. Icon 618 may be generated when battery power level 608 is below one or more of a trip start value, an amount of energy required to get the driver and their vehicle to a known home destination, or is enough to get a driver of the vehicle to a recharge station along recharge station route 628. Recharge station route 628 may be generated with navigation directions in response to selection of icon 618.

Vehicle configuration field 606 provides visual indications of recommended modifications to a vehicle configuration used to traverse along completed route 622 during a subsequent trip. Vehicle configuration field 606 includes vehicle graphic 630. Vehicle graphic 630 is shown as a top view of the vehicle. Vehicle graphic 630 may include any visible orientation of the vehicle and is shown as indicating recommended tire pressures 632 (e.g., as determined by processing circuitry configured to provide vehicle configuration modification recommendations based on an analysis of the efficiency of energy consumed by a vehicle that traverse along completed route 622 by one or more vehicle system sensors) and recommended cargo position 634. Recommended cargo position 634 may be generated based on data collected during the generation of energy consumption report 400 of FIG. 4. In some embodiments one or more elements of vehicle graphic 630 may be generated based on one or more textual recommendations generated for display via recommendations 614 (e.g., using processing circuitry 808 of FIG. 8).

FIG. 7 depicts a flow chart representing method 700 for generating energy consumption coaching recommendation 600 of FIG. 6, in accordance with some embodiments of the disclosure. Method 700 may be executed, in whole or in part, based on the execution of scenario 100 of FIG. 1, in whole or in part. Additionally, or alternatively, system 800 of FIG. 8 depicts a vehicle system configured to execute one or more aspects of scenario 100, method 700 of FIG. 7, and method 900 of FIG. 9 that each provide a means of generation of energy consumption coaching recommendation 600 (e.g., corresponding to readout 108 of FIG. 1).

At 702, a determination is made that the vehicle has completed traversing the route. For example, one or more of processing circuitry 808 or sensor arrangement 818 may transmit data indicative that the vehicle has reached an end point of the route. At 704, data is retrieved corresponding to at least one previous trip along the route, wherein the at least one previous trip was completed by a previous vehicle comprising at least one configuration element that is related to the vehicle that completed traversing the route. For example, the data may be the same as or related to the data retrieved in relation to process block 308 of FIG. 3 or process block 504 of FIG. 5. If, at 706, at least one configuration element is different between the previous vehicle that completed the route and the current vehicle hat completed traversing the route (YES at 706), then at least one recommendation is generated at 708 for improving an efficiency of energy consumption for a subsequent trip along the route by providing instructions to modify the at least one configuration element of the vehicle that completed traversing the route to align with one or more parameters or settings corresponding to the at least one element of the previous vehicle. For example, if tire pressure was different between the vehicle configurations and a statistical computation (e.g., as computed in a manner similar to the compatibility score generated at process block 312 of FIG. 3) indicates a modification of the tire pressure would improve a likelihood of route completion of the current vehicle or improve efficiency of energy consumed while traversing the route, then a recommendation to adjust the current vehicle tire pressure to align with the tire pressure of a successful trip completion may be generated. The differences in parameters, the statistical likelihood of a positive impact on a subsequent route, and available changes to the driver of the vehicle are all considered when generating the at least one recommendation.

If, at 706, at least one configuration element is not different between the previous vehicle that completed the route and the current vehicle hat completed traversing the route (NO at 706), then information is retrieved at 710 corresponding to one or more of future road conditions or future weather conditions corresponding to the route. For example, if the route is muddy today from a recent rain storm, then weather forecasts are reviewed for one or more sunny days following the rain storm where the route may have an opportunity to dry out and be less muddy. If, at 712, one or more of the future road conditions or future weather conditions are determined to be different from one or more of current road conditions or current weather conditions, respectively, (YES at 712) then at least one recommendation is generated at 714 for improving an efficiency of energy consumption for a subsequent trip along the route by providing one or more of a subsequent date to traverse the route, weather conditions to avoid, or road conditions to avoid. For example, the system may be configured to look up to a month in advance of a current date to identify future dates with future preferable road conditions for the driver of the current vehicle to traverse the route using a current vehicle configuration. If, at 712, one or more of the future road conditions or future weather conditions are not determined to be different from one or more of current road conditions or current weather conditions, respectively, (NO at 712) then at least one recommendation is generated at 716 for improving an efficiency of energy consumption for a subsequent trip along the route by providing one or more recommendations for modifying at least one element of the configuration of the vehicle. For example, a route may be arranged along terrain that constantly receives water run off and will be muddy for a substantial amount of time (e.g., longer than 1 month or all year round). The recommendation may include vehicle configuration modifications to improve energy consumption efficiency of the vehicle such that the vehicle can traverse muddy trails without consuming an energy battery pack charge over the course of a single muddy trail.

FIG. 8 depicts a block diagram of vehicle system 800, in accordance with some embodiments of the disclosure. Vehicle system 800 may be used, in whole or in part, for the execution of one or more aspects of scenario 100 of FIG. 1. Vehicle system 800 is configured to execute, in whole or in part, one or more of method 300 of FIG. 3 for generating energy prediction report 200, method 500 of FIG. 5 for generating energy consumption report 400 of FIG. 4, method 700 of FIG. 7 for generating energy consumption coaching recommendation 600 of FIG. 6, or method 900 of FIG. 9.

Vehicle system 800 is comprised of vehicle body 802, server 822, remote device 820, accessory 824, and equipment 828 (e.g., cargo). Vehicle body is configured to be communicatively coupled to one or more of remote device 820 and server 822. Remote device 820 may comprise a user mobile device of a driver of vehicle system 800. Server 822 corresponds to one or more servers with access to or comprising one or more data sets related to navigation interfaces, off-road travel data, vehicle configuration data, or driver behavior data along routes. Communication circuitry 816 within vehicle body 802 enables processing circuitry 808 to be in communication (e.g., one or more of transmit or receive instructions or data) with remove device 820 and server 822. One or more of the elements depicted within or coupled to vehicle body 802 may receive power (e.g., electrical power) via power source 804.

Arranged within vehicle body 802 is processing circuitry 808. Processing circuitry 808 may be configured to store instructions related to or execute one or more of the process blocks depicted and described in reference to FIG. 3, 5, 7, or 9. In some embodiments, processing circuitry 808 may be arranged throughout vehicle body 802 (e.g., as part of multiple individual modules) or may be centralized in a single location (e.g., as a central computing device or apparatus for executing various functions via vehicle system 800). Processing circuitry 808 is depicted as being in bilateral communication with one or more of navigation system 806 and communication circuitry 816. In some embodiments, these chains of communication may be unilateral in either direction. Processing circuitry is also configured to receive data transmitted from sensor 810a, sensor 810b, and sensor arrangement 818. Sensor 801a is communicatively coupled to attachment port 812. Attachment port 812 is configured to receive attachment plug 826 of accessory 824. Accessory 824 may be configured to draw power from vehicle body 802 (e.g., may provide an extra energy drain for battery power computations) and, in some embodiments, accessory 824 is configured to receive equipment 828 (e.g., cargo) which may affect a weight distribution of vehicle body 802. Sensor 810a transmits data indicative of one or more of a power drain caused by accessory 824, an engagement status of attachment plug 826, or a weight distribution modification caused by equipment 828 as it affects vehicle body 802. Sensor 810b is configured to provide data corresponding to cargo area 814. Cargo area 814 may, for example, receive one or more iterations of equipment 828. Sensor 810b may transmit one or more of imagery, weight data, or data characterizing the contents of cargo area 814 in order to improve an accuracy of energy consumption computations performed in reference to the one or more methods of this disclosure. Sensor arrangement 818 provides characterizing data of vehicle body 802 and the contents thereof to also improve an accuracy of energy consumption computations performed in reference to the one or more methods of this disclosure. For example, sensor arrangement 818 may provide one or more of suspension travel data, suspension range data, actuator activation data, tire pressure, overall weight, weight distribution, or other data used to characterize one or more of four corners of vehicle body 802.

FIG. 9 is a flow chart representing method 900 for generating multiple readouts during different portions of a trip along a route (e.g., as execute part vehicle system 800 of FIG. 8), in accordance with some embodiments of the disclosure. Method 900 may be executed, in whole or in part, based on the execution of scenario 100 of FIG. 1, in whole or in part. Additionally, or alternatively, system 800 of FIG. 8 depicts a vehicle system configured to execute one or more aspects of scenario 100, method 300 of FIG. 3, method 500 of FIG. 5, method 700 of FIG. 7 and method 900 of FIG. 9 that each provide example means of generation of one or more of readouts, displays, recommendations, or combinations thereof described in this disclosure (e.g., corresponding to one or more of readouts 104, 106, or 108 of FIG. 1).

At 902, processing circuitry predicts one or more of a rate of energy consumption of a vehicle or an amount of energy to be consumed by a vehicle arranged to traverse a route. For example, one or more aspects of method 300 of FIG. 3 may be executed in order to determine whether the vehicle has enough stored energy to traverse a route. If, at 904, the vehicle is determined to not have started the route (NO at 904), then determination of whether a vehicle has enough stored energy to traverse a route is made by predicting one or more of a rate of energy consumption of a vehicle or an amount of energy to be consumed by a vehicle arranged to traverse a route at 902. If, at 904, the vehicle is determined to have started the route (YES at 904), then recommendations are provided at 906 to improve an efficiency of energy consumed by the vehicle while traversing the route. For example, one or more aspects of method 500 of FIG. 5 may be executed in order to determine whether there are modifications to one or more of a vehicle configuration or driver behavior along the route to improve the efficiency of energy consumption by the vehicle which, by extension, would improve a likelihood that the vehicle can complete the route without needing to recharge a power supply (e.g., a battery). If, at 908, the vehicle is determined to not have completed the route (NO at 908), then recommendations are provided at 906 to improve an efficiency of energy consumed by the vehicle while traversing the route. If, at 908, the vehicle is determined to have completed the route (YES at 908), then at least one recommendation is generated at 910 for improving an efficiency of energy consumption for a subsequent trip along the route. For example, one or more aspects of method 700 of FIG. 7 may be executed to generate the at least one recommendation.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
predicting a rate of energy consumption of a vehicle arranged to traverse a route;
providing recommendations to improve an efficiency of energy consumed by the vehicle while traversing the route; and
in response to determining the vehicle has completed the route, generating at least one recommendation for improving an efficiency of energy consumption for a subsequent trip along the route.

2. The method of claim 1, wherein determining whether the vehicle has enough stored energy to traverse the route comprises:
identifying data corresponding to a previous trip associated with the route;
comparing a first configuration of the vehicle with a second configuration of a vehicle that completed the trip;
generating, based on the comparison, a compatibility score;
comparing the compatibility score to a threshold; and
in response to determining the compatibility score meets or exceeds the threshold, generating for display an indication of whether the vehicle has enough energy stored to traverse the route.

3. The method of claim 2, wherein identifying data comprises requesting data from a server of previous trips completed along the route using the vehicle.

4. The method of claim 2, wherein identifying data comprises requesting data from a server of previous trips completed along the route using other vehicles with one or more attributes related to the vehicle.

5. The method of claim 2, wherein identifying data corresponding to the previous trip associated with the route comprises:
determining one or more identifying aspects of the route;
searching for one or more of weather conditions or road conditions related to the route; and
retrieving trip data from a server configured to store data related to vehicles that completed the route.

6. The method of claim 2, wherein the first configuration comprises one or more of the following aspects of vehicle information corresponding to the vehicle:
vehicle total weight;
vehicle weight distribution;
contents of cargo areas;
tire pressure;
battery charge;
wheel base;
ride height;
active vehicle system errors; or
tire and wheel size.

7. The method of claim 1, wherein providing recommendations to improve the efficiency of energy consumed while traversing the route comprises generating one or more of the following:
adjust tire pressure;
adjust weight distribution;
change location of cargo within vehicle;
change drive mode; or
adjust ride height.

8. The method of claim 1, wherein generating the at least one recommendation for improving the efficiency of energy consumption for the subsequent trip along the route comprises generating one or more of the following:
subsequent trip dates with different weather patterns;
vehicle load layout modifications;
vehicle configuration modifications; or
tire modifications based on route surface conditions.

9. The method of claim 2, wherein the indication further comprises one or more of:
a notification of current energy level of the vehicle;
a notification of whether the current energy levels are sufficient to enable the vehicle to traverse the route in its entirety based on a current progress along the route;
a recommendation for recharge;
a location of where one or more charging stations are accessible, based on the current energy level of the vehicle; or
conditions associated with the route which could affect the ability of the vehicle to complete the route.

10. A vehicle system comprising:
a power source;
a navigation system;
a vehicle assembly comprised of the power source and the navigation system;
a plurality of sensors configured to characterize the vehicle assembly; and
processing circuitry arranged within the vehicle assembly and communicatively coupled to the power source, the navigation system, and one or more of the plurality of sensors, wherein the processing circuitry is configured to:
predict a rate of energy consumption of a vehicle arranged to traverse a route;
provide recommendations to improve an efficiency of energy consumed by the vehicle assembly while traversing the route; and
in response to determining the vehicle assembly has completed the route, generate at least one recommendation for improving an efficiency of energy consumption for a subsequent trip along the route.

11. The vehicle system of claim 10, wherein the processing circuitry configured to determine whether the power source has enough stored energy to traverse the route is further configured to:
identify data corresponding to a previous trip associated with the route;
compare a first configuration of the vehicle with a second configuration of a vehicle that completed the trip;
generate, based on the comparison, a compatibility score;
compare the compatibility score to a threshold; and
in response to determining the compatibility score meets or exceeds the threshold, generate for display an indication of whether the vehicle has enough energy stored to traverse the route.

12. The vehicle system of claim 11, wherein the processing circuitry configured to identify data is further configured to request data from a server of previous trips completed along the route using the vehicle assembly.

13. The vehicle system of claim 11, wherein the processing circuitry configured to identify data is further configured to request data from a server of previous trips completed along the route using vehicles with one or more attributes related to the vehicle assembly.

14. The vehicle system of claim 11, wherein the processing circuitry configured to identify data corresponding to the previous trip associated with the route is further configured to:
determine one or more identifying aspects of the route;
search for one or more of weather conditions and road conditions related to the route; and retrieve trip data from a server configured to store data related to vehicles that completed the route.

15. The vehicle system of claim 11, wherein processing circuitry configured to generate the compatibility score is further configured to generate the compatibility score based on a comparison of aspects of vehicle information between the vehicle and the vehicle that completed the trip.

16. The vehicle system of claim 11, wherein the indication comprises one or more of:
    a notification of current energy level of the vehicle;
    a notification of whether the current energy levels are sufficient to enable the vehicle to traverse the route in its entirety;
    a recommendation for recharge;
    a location of where one or more charging stations are accessible, based on the current energy level of the vehicle; or
    conditions associated with the route which could affect the ability of the vehicle to complete the route.

17. The vehicle system of claim 10, wherein one or more of the plurality of sensors configured to characterize the vehicle assembly are configured to detect one or more of the following aspects of vehicle information corresponding the vehicle assembly:
    vehicle total weight;
    vehicle weight distribution;
    contents of cargo areas;
    tire pressure;
    battery charge;
    wheel base;
    ride height;
    active vehicle system errors; or
    tire and wheel size.

18. The vehicle system of claim 10, wherein the navigation system is configured to identify the route and attributes of the route including one or more of current weather conditions or current road conditions along the route.

19. A non-transitory computer readable medium comprising computer readable instructions which, when processed by processing circuitry, causes the processing circuitry to:
    predict a rate of energy consumption of a vehicle arranged to traverse a route;
    in response to determining the vehicle has started to traverse the route, provide recommendations to improve an efficiency of energy consumed by the vehicle while traversing the route; and
    in response to determining the vehicle has completed the route, generate for display at least one recommendation for improving an efficiency of energy consumption for a subsequent trip along the route using the vehicle.

20. The non-transitory computer readable medium of claim 19, further comprising computer readable instructions that cause the processing circuitry to determine whether the vehicle has enough stored energy to traverse the route by:
    identifying data corresponding to a previous trip associated with the route;
    comparing a first configuration of the vehicle with a second configuration of a vehicle that completed the trip;
    generating, based on the comparison, a compatibility score;
    comparing the compatibility score to a threshold; and
    in response to determining the compatibility score meets or exceeds the threshold, generating for display an indication of whether the vehicle has enough energy stored to traverse the route.

* * * * *